(12) United States Patent
Matzen

(10) Patent No.: US 9,194,718 B2
(45) Date of Patent: Nov. 24, 2015

(54) FIELD DEVICE FOR PROCESS INSTRUMENTATION

(75) Inventor: Steen Moellebjerg Matzen, Sydals (DK)

(73) Assignee: Siemens Aktiengesellschaft, Munich (DE)

( * ) Notice: Subject to any disclaimer, the term of this patent is extended or adjusted under 35 U.S.C. 154(b) by 829 days.

(21) Appl. No.: 13/503,803

(22) PCT Filed: Oct. 26, 2010

(86) PCT No.: PCT/EP2010/066108
§ 371 (c)(1),
(2), (4) Date: Jul. 3, 2012

(87) PCT Pub. No.: WO2011/054696
PCT Pub. Date: May 12, 2011

(65) Prior Publication Data
US 2012/0278042 A1    Nov. 1, 2012

(30) Foreign Application Priority Data
Oct. 26, 2009    (DE) .......................... 10 2009 050 645

(51) Int. Cl.
*G06F 11/30*    (2006.01)
*G01D 3/036*    (2006.01)
(Continued)

(52) U.S. Cl.
CPC ............ *G01D 3/036* (2013.01); *G05B 23/0235* (2013.01); *G05B 19/0425* (2013.01); *G05B 23/0237* (2013.01); *G05B 2219/25428* (2013.01); *G05B 2219/33331* (2013.01)

(58) Field of Classification Search
CPC    G06F 11/30; G05B 23/0235; G05B 23/0237; G05B 2219/25428; G05B 2219/33331; G05B 19/0425; G01D 3/036
USPC .......................................................... 702/183
See application file for complete search history.

(56) References Cited

U.S. PATENT DOCUMENTS 4,783,659 A * 11/1988 Frick .......................... 340/870.37
5,523,676 A *  6/1996 Bach et al. .................. 324/103 P
5,705,978 A    1/1998 Frick et al.
(Continued)

FOREIGN PATENT DOCUMENTS

| CN | 1108596 | 5/2003 |
|---|---|---|
| CN | 1615497 | 5/2005 |

(Continued)

*Primary Examiner* — Mohamed Charioui
*Assistant Examiner* — Ruihua Zhang
(74) *Attorney, Agent, or Firm* — Cozen O'Connor

(57) ABSTRACT

A field device for process instrumentation comprising a measurement transducer having an analog output to which a two-wire line can be connected for transmitting an analog output signal, wherein a unit galvanically separates the processor from an analog output circuit. A read-back channel for a pulse-width modulated digital signal, which is tapped behind an element for galvanic separation, is provided for monitoring generation of the analog output signal, and a unit is provided for monitoring the analog output signal to maintain a specifiable maximum deviation from a reference signal, which is generated in the same manner as the analog output signal by low-pass filtering from the pulse-width modulated digital signal. In the case of transient signals, the monitoring unit advantageously detects error states quickly and appropriate measures for reacting to the error states can therefore be implemented in less time.

5 Claims, 1 Drawing Sheet

(51) Int. Cl.
*G05B 23/02* (2006.01)
*G05B 19/042* (2006.01)

(56) References Cited

U.S. PATENT DOCUMENTS

| | | |
|---|---|---|
| 7,139,683 B2 | 11/2006 | Pfündlin et al. |
| 7,539,600 B2 | 5/2009 | Pfündlin et al. |
| 8,271,227 B2 | 9/2012 | Matzen |
| 2002/0082799 A1 | 6/2002 | Pramanik |
| 2005/0149295 A1 | 7/2005 | Pfündlin et al. |
| 2007/0073523 A1 | 3/2007 | Pfündlin et al. |
| 2008/0258831 A1 * | 10/2008 | Kunihiro et al. ............. 332/103 |
| 2009/0183575 A1 | 7/2009 | Matzen |
| 2010/0302085 A1 | 12/2010 | Chemisky et al. |
| 2010/0305896 A1 | 12/2010 | Chemisky et al. |

FOREIGN PATENT DOCUMENTS

| | | | |
|---|---|---|---|
| CN | 101454641 | | 6/2009 |
| DE | 10 2007 022 991 | | 11/2008 |
| DE | 10 2007 046 560 | | 4/2009 |
| DE | 10 2007 059 847 | | 6/2009 |
| EP | 1 192 614 | | 1/2003 |
| GB | 1366365 | * | 9/1974 |
| WO | WO 2009/043821 A1 | * | 4/2009 |
| WO | WO 2009/074681 A3 | * | 6/2009 |

* cited by examiner

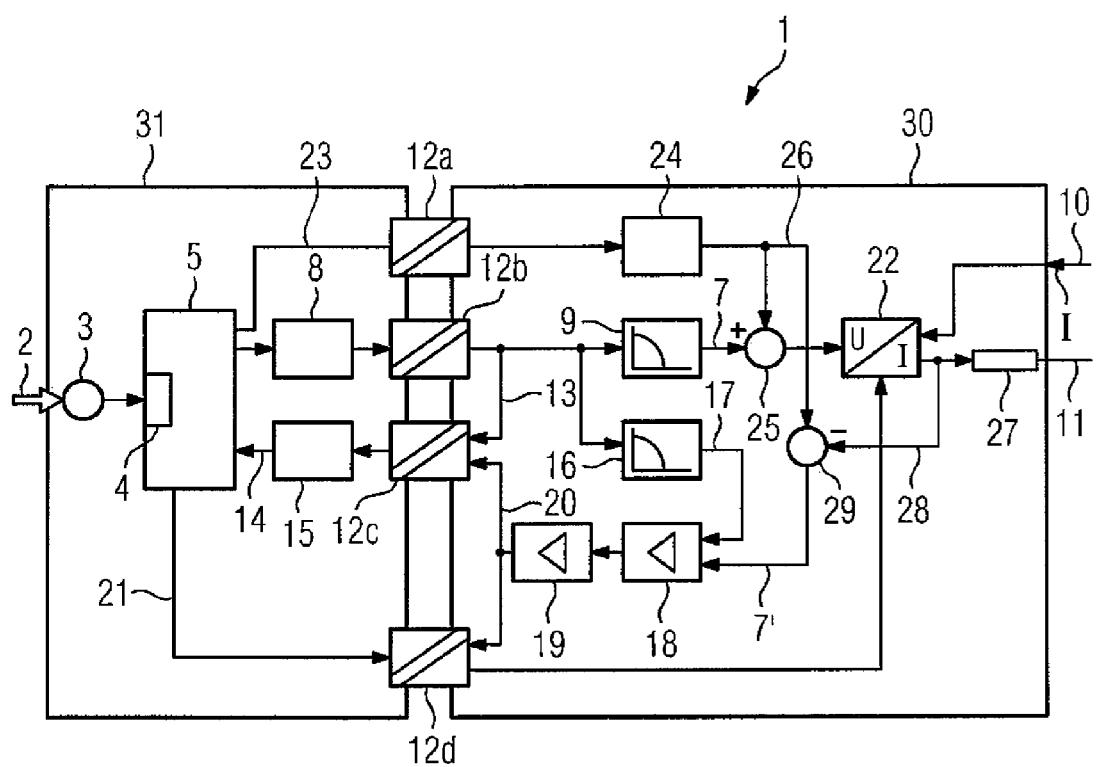

FIELD DEVICE FOR PROCESS INSTRUMENTATION

CROSS-REFERENCE TO RELATED APPLICATIONS

This is a U.S. national stage of application No. PCT/EP2010/066108 filed 26 Oct. 2010. Priority is claimed on German Application No. 10 2009 050 645.4 filed 26 Oct. 2009, the content of which is incorporated herein by reference in its entirety.

BACKGROUND OF THE INVENTION

1. Field of the Invention

The invention relates to a field device for process instrumentation and, more particularly, to a measurement transducer having an analog output to which a two-wire line for transmitting an analog output signal can be connected.

2. Description of the Related Art

Field devices for process instrumentation are often used in automation technology, where the field devices are used, for example, to record and/or influence process variables and are connected to one another by an automation network for interchanging data. Field devices that record a physical or chemical variable as a process variable are often referred to as measurement transducers because they convert the respective variable into a measured value and output the latter to a superordinate control station, for example, or, in the form of an actual value, to a controller for further processing. Examples of such measurement transducers are measurement transducers for a filling level, mass flow, pressure, temperature, pH or conductivity.

EP 1 192 614 B1 discloses a measurement transducer that converts a physical or chemical measurement variable into an analog output signal that corresponds to the measured value and which can be transmitted on a two-wire line. For this purpose, a suitable sensor for the physical or chemical measurement variable, a downstream analog/digital converter, a computation unit subordinate to the latter and an output circuit that is controlled by the computation unit and can be connected to the two-wire line are provided. The sensor converts the measurement variable into a sensor signal which is digitized in the analog/digital converter and is preprocessed in the computation unit to form a desired value which is used to set the analog output signal on the two-wire line by a control device in the output circuit. The digital desired value, in the form of a predefined current value, is first of all converted into an analog desired current value in the output circuit using a digital/analog converter and is converted into an analog loop current by a downstream control circuit. The actual value of the loop current is recorded using a measuring element for current/voltage conversion. Low-impedance current measuring resistors, which are also referred to as shunts, can be used as simple measuring elements for this purpose. The voltage signal which is generated thereby and is proportional to the actual value of the loop current is supplied to a comparison device for the purpose of forming a control deviation from the analog desired current value and the actual value of the loop current.

A controller comprising an analog controller having an integrated operational amplifier uses the control deviation to determine, for the purpose of correcting the control deviation, an actuating signal for an actuator that is formed by a transistor circuit for setting the loop current. At the same time, the measured analog actual value of the loop current is digitized with the aid of an analog/digital converter and is supplied to the computation unit in the form of a digital actual value. The computation unit is thus able to determine deviations between the digital actual value and the digital desired value and to respond thereto by appropriate tracking of the desired value. If impermissibly large deviations occur, the user of the field device is informed of this. This may be effected via a data interface and/or a display apparatus for transmitting and/or displaying an item of information relating to the deviation which has been determined and thus relating to the measurement error. The data interface is part of the output circuit and enables data communication via the two-wire line according to the Highway Addressable Remote Transducer (HART) protocol.

Data communication according to the HART protocol is performed using continuous-phase frequency modulation with a data transmission rate of 1200 bits/sec. The frequency-modulated current signal, the amplitude of which is supposed to be less than 600 µA, is superimposed on the analog output signal from a 4 to 20 mA interface in a known manner.

DE 10 2007 059 847 A1 discloses a field device having an analog output, in which it is possible to detect a malfunction of the controller or a malfunction of the actuator for the loop current. For this purpose, the actuating signal is monitored for compliance with a predefinable range of values with the aid of a comparator. If a deviation from the range of values occurs, an indication signal signals the detected error state and suitable error-handling measures may be initiated. This may be, for example, the output of an error message or the notification of a superordinate control station of a need for maintenance via the two-wire line and/or the assumption of a safety state by the field device. A safety state is indicated in the analog output signal by a current level that is greater than 22.6 mA or less than 3.5 mA.

One problem when monitoring an analog output circuit for correct operation is represented by the low-pass filter that usually has to be used to smooth the analog output signal. In particular, if a favorable pulse width modulator with a downstream low-pass filter is used for digital/analog conversion, the low-pass filter, which is intended to limit the analog output signal to a bandwidth of less than 25 Hz, constitutes a considerable part of the analog output circuit. Removing the frequency-modulated signal that has been superimposed for data transmission is also problematic when monitoring the analog output current for a correctly set value if a low-pass filter is used for this purpose. Low-pass filters always give rise to a signal delay, with the result that a current value measured at the output for monitoring purposes has a considerable delay with respect to a digital value which is applied to a digital/analog converter of the analog output circuit in order to generate the analog output signal. In addition, low-pass filters usually do not have a constant group delay time, with the result that transient signals in the transition area are output in a corrupted manner. The signal delay in the analog output circuit therefore cannot be easily compensated for by a corresponding delay of the digital value, which is passed to the digital/analog converter, in a monitoring device. One possibility for circumventing the described problems is to exclude time windows with transient signal profiles from the monitoring process. However, a monitoring process would then presuppose a desired value of the output current which is constant over a minimum period of time. However, since it cannot be ensured that this condition is met in a predefined period of time, a maximum period of time in which an error state of the analog output circuit is detected therefore could not be guaranteed.

SUMMARY OF THE INVENTION

It is therefore an object of the invention to provide a field device for process instrumentation having an analog output to which a two-wire line for transmitting an analog output signal can be connected, where it is possible to monitor the circuit for generating the analog output signal with improved accuracy and/or with lower demands imposed on the signal profile.

This and other objects and advantages are achieved in accordance with the invention by providing a field device in which the process of monitoring the analog output circuit can be constantly activated, and time windows in which the monitoring process is interrupted are virtually not required. Malfunctions of the analog output circuit can thus be detected without a significant delay. As a result, a field device can be changed to a safe state in a comparatively quick manner in the event of a malfunction.

The monitoring process can advantageously be used with any type of signal profile, for example, with transitions in the form of steps, staircases or ramps, as well as with a constant profile of the analog output signal.

Since only digital signals can be passed through a DC-isolation device, the outlay for analog DC-isolation in the analog output circuit is advantageously dispensed with. As for the outlay for producing the analog output circuit, it is also advantageous that it is possible to dispense with an expensive digital/analog converter since the conversion is performed with the aid of pulse width modulation and subsequent low-pass filtering. Since the filter is implemented in the analog part of the analog output circuit, there is also no need for any complex software which would take up a large part of the computation power available in the computation unit.

In the field device in accordance with the invention, it is possible to completely monitor the circuit for generating the analog output signal in a particularly advantageous manner. This is because errors in the DC-isolation device, which would not be detected solely by monitoring the analog output signal for compliance with a predefinable maximum deviation from the comparison signal, are also detected with the aid of the read-back channel for the pulse-width-modulated digital signal.

In one particularly advantageous embodiment, a comparator is provided for the purpose of generating the indication signal, and the indication signal is passed to the computation unit for further handling of a detected error state. This has the advantage that, if an error state is detected, the computation unit can immediately initiate suitable error-handling measures. These may be the same measures which are also taken when the read-back channel of the pulse-width-modulated digital signal detects an error. Here, it is advantageously possible to dispense with an additional input of the computation unit for the indication signal and an additional channel in the DC-isolation device if, when an indication signal is generated, the indication signal interrupts the read-back channel.

In another advantageous embodiment, in the case of a field device in which a frequency-modulated signal in accordance with the HART protocol is superimposed on the analog output signal, the device for monitoring the generation of the analog output signal may be supplemented with a subtractor that removes the superimposed frequency-modulated signal from the output signal and is connected upstream of the device for monitoring the analog output signal for compliance with the predefinable maximum deviation in the path of the analog output signal. As a result, the monitoring device can be equally used in 4 to 20 mA interfaces with or without HART communication and the maximum deviation can be predefined such that the maximum deviation is less than the amplitude of the superimposed frequency-modulated signal.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention as well as refinements and advantages are explained in more detail below using the drawing which illustrates an exemplary embodiment of the invention, in which:

The FIGURE is a schematic block diagram of the field device in accordance with the invention.

DETAILED DESCRIPTION OF THE PREFERRED EMBODIMENTS

The FIGURE shows the fundamental structure of a measurement transducer 1 which is suitable for use in an automation system for recording a chemical or physical variable 2. The variable 2 is passed to a sensor 3 which converts the variables into an electrical signal. The analog measurement signal generated in this manner is digitized using an analog/digital converter 4 which is located at an analog input of a computation unit 5 in which the linearity and temperature behavior of the measurement signal are corrected. A digital predefined value of an analog output signal 7, which value corresponds to the measured value and is calculated by the computation unit 5, is converted into the analog output signal 7 with the aid of a digital/analog converter. The digital/analog converter is formed by a pulse width modulator 8 and a downstream low-pass filter 9. The pulse width modulator 8 may comprise a component that is separate from the computation unit 5 or may be integrated in the computation unit 5 if the computation unit 5 itself is able to generate and output a pulse-width-modulated digital signal corresponding to the digital predefined value. The low-pass filter 9 limits the bandwidth of the analog output signal 7 to a frequency range below 25 Hz.

The circuit shown for generating a loop current I in a two-wire line 10, 11 is provided with a device for DC-isolating an analog output 30 from circuit parts 31 with the sensor 3, which device consists of four elements 12a, 12b, 12c and 12d. Each of these elements is used for the DC-isolated transmission of a digital signal. The element 12b is connected between the pulse width modulator 8 and the low-pass filter 9. In order to monitor the pulse width modulator 8 and the element 12b, provision is made of a read-back channel which is used to pass a second pulse-width-modulated digital signal 13, which is tapped off downstream of the element 12b, to the computation unit 5 via the element 12c of the DC-isolation device as a read-back signal 14. The read-back signal 14 is a digital value which is obtained with the aid of a demodulator 15 in accordance with the second pulse-width-modulated digital signal 13.

A second low-pass filter 16, which preferably has an identical design to the low-pass filter 9, is used to monitor the correct operation of the low-pass filter 9. The second low-pass filter 16 provides a comparison signal 17 which is compared with a measured analog output signal 7' corresponding to the analog output signal 7 with the aid of a subtraction element 1B and a comparator 19. If the deviation of the measured analog output signal 7' from the comparison signal 17 exceeds a predefinable maximum value, an indication signal 20 which indicates an erroneous state is generated. So that there is no need for an additional channel in the DC-isolation device for the purpose of supplying the indication signal 20 to the computation unit 5, the indication signal 20 is passed to the element 12c in a manner linked to the second pulse-width-modulated digital signal 13. If there is a level of the indication signal 20 to indicate an error, the transfer of the second pulse-width-modulated digital signal 13 via the element 12c is blocked. The computation unit 5 detects the presence of the error state from this failure. The error detected in this manner can be reported to an operator or, via the two-wire line 10, 11, to a superordinate control station in an automation system by appropriately driving an indication unit of the measurement transducer 1, which unit is not illustrated in the FIGURE for the sake of clarity. It is possible to completely monitor the generation of the analog output signal 7 in the output circuit of the measurement transducer 1 in the manner described. In order to report that the measurement transducer 1 is in the protected state, the computation unit 5 generates an indication signal 21 which is passed via the element 12d of the DC-isolation device and drives a current controller 22 for generating the loop current I such that the loop current I is set to a value greater than 22.6 mA or less than 3.5 mA.

The 4 to 20 mA interface of the measurement transducer illustrated in the FIGURE is additionally able to perform data transmission in accordance with the HART protocol. In order to transmit data, the computation unit 5 outputs a digital signal 23 which is passed to a frequency modulator 24 via the element 12a of the DC-isolation device. Before the analog output signal is passed to the current controller 22, the frequency modulated output signal 26 from the frequency modulator 24 is superimposed on the analog output signal with the aid of a summing device 25. The loop current I therefore consists of an analog part corresponding to the analog output signal 7 and an AC part corresponding to the frequency-modulated signal 26. The magnitude of the loop current I which has been set is detected with the aid of a measuring resistor 27 which can also be used to detect the actual value in the control loop of the current controller 22. An output signal 28 representing this magnitude is passed to a subtractor 29 which removes the AC component, which corresponds to the frequency-modulated signal 26, from the signal 28. As the output signal, the subtractor 29 thus provides the measured analog output signal 7' which has been freed of the AC part generated in accordance with the HART protocol. As a result of the loop current I being detected downstream of the current controller 22, the loop current I is also advantageously monitored for correct operation. In addition, the current controller 22 can be supplemented with the monitoring device known from previously described publication DE 10 2007 059 847 A1. This document also describes the detailed structure of the current controller 22 which has not been illustrated in the present application for the sake of clarity. The process of monitoring the generation of the analog output signal, as described in the present application, can equally be used with a 4 to 20 mA interface with or without data transmission in accordance with the HART protocol on account of the use of the subtractor 29.

A measurement transducer that is a field device is described in the exemplary embodiment shown. It should be understood that the invention can also be used in other types of field devices with an analog output, for example, in actuators such as control valves, or in a programmable logic controller with an analog output assembly which is suitable, for example, for connecting actuators via two-wire lines.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A field device for process instrumentation, comprising:
   an analog output, to which a two-wire line for transmitting an analog output signal is connectable;
   a computation unit;
   a generation device configured to generate a first pulse-width-modulated digital signal corresponding to the analog output signal;
   a plurality of DC-isolation devices configured in parallel to communicate with the computation unit, a DC-isolation device of the plurality of DC-isolation devices being configured to receive the first pulse-width-modulated digital signal and output a second pulse-width-modulated digital signal corresponding to the first pulse-width-modulated digital signal;
   a first low-pass filter configured to generate the analog output signal from the second pulse-width-modulated digital signal;
   a first monitoring device configured to monitor the generation of the analog output signal, the first monitoring device comprising:
      a read-back channel configured to return the second pulse-width-modulated digital signal, through another DC-isolation device of the plurality of DC-isolation devices, to the computation unit as a read-back signal in order to be checked;
      a second low-pass filter configured to generate a comparison signal for the analog output signal from the second pulse-width-modulated digital signal; and
      a second monitoring device configured to monitor the analog output signal for compliance with a predefinable maximum deviation from the comparison signal and to generate an indication signal if the a predefinable maximum deviation is exceeded.

2. The field device as claimed in claim 1, wherein the second monitoring device comprises:
   a comparator configured to generate the indication signal, wherein the indication signal is passed to the computation unit for further handling of a detected error state.

3. The field device as claimed in claim 1, further comprising:
   a former device configured to form an output signal by superimposing a frequency-modulated signal in accordance with a HART protocol on the analog output signal; and
   wherein the first monitoring device further comprises a subtractor configured to remove the superimposed frequency-modulated signal from the analog output signal.

4. The field device as claimed in claim 2, further comprising:

a former device configured to form an output signal by superimposing a frequency-modulated signal in accordance with a HART protocol on the analog output signal; and wherein the first monitoring device further comprises a subtractor configured to remove the superimposed frequency-modulated signal from the analog output signal.

5. The field device as claimed in claim 1, wherein the field device comprises a measurement transducer.

* * * * *